Patented Aug. 17, 1926.

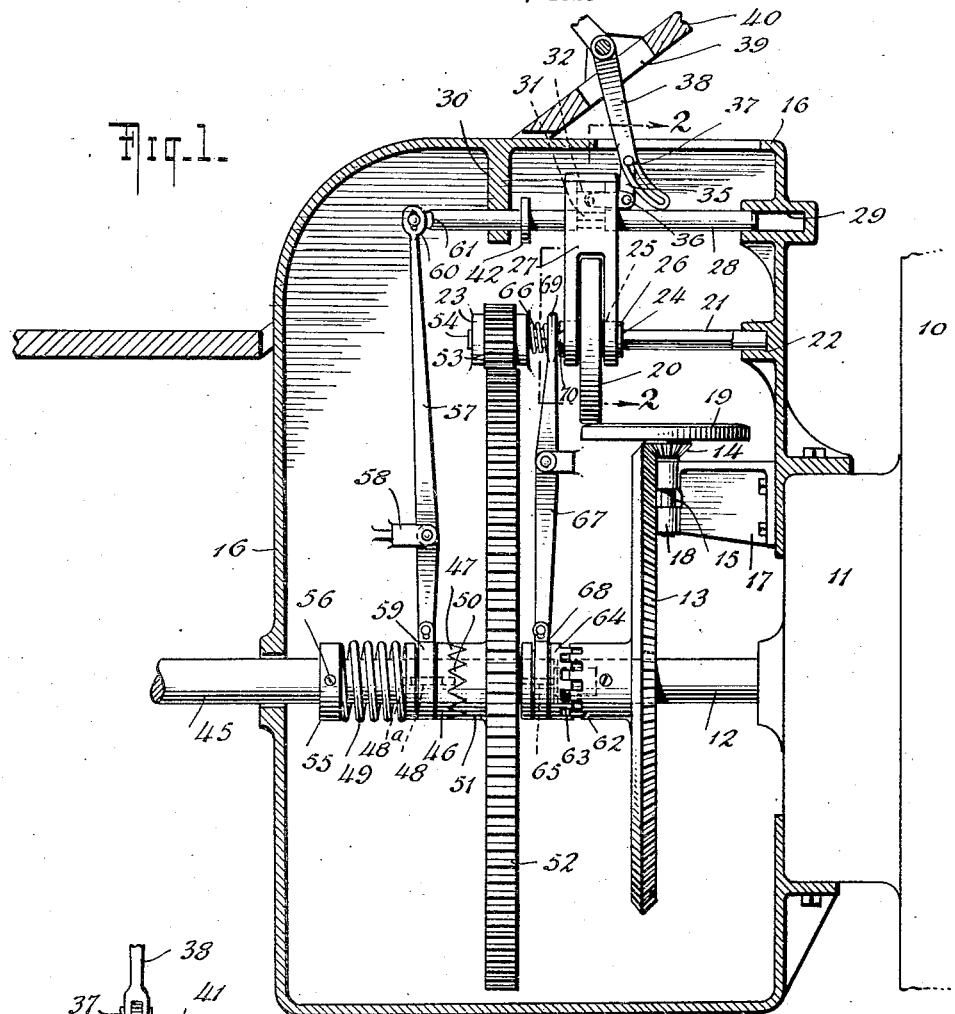

1,596,153

UNITED STATES PATENT OFFICE.

FREDERIC C. CHADBORN, OF NEWBURGH, NEW YORK.

TRANSMISSION DEVICE.

Application filed December 29, 1923. Serial No. 683,331.

This invention relates to transmission devices and has for its principal object to provide a new and improved construction, by means of which a frictional speed change gear is interposed between a driving and driven shaft, intermediate two or more gear trains, at a point where the torque which the frictional drive must transmit is reduced because of the higher speeds at such point, whereby a lighter and therefore more easily manipulated frictional drive may be employed than if the said drive were placed directly between the driving and driven shafts.

Another object is to provide in combination with a frictional drive, an overload clutch and connections therefrom to the frictional drive to cause said frictional drive to be operated to decrease the speed automatically when the resistance offered by the driven shaft exceeds a predetermined amount.

Another object is to provide a second clutch to connect the driving and driven shafts directly and to provide means to actuate said clutch automatically by the movement of the frictional driving gear when it is moved to its point of maximum speed ratio.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:—

Fig. 1 is an elevation of a transmission gear embodying my invention, the transmission casing being shown in section.

Fig. 2 is a section on the line 2—2 of Fig. 1, and

Fig. 3 is an enlarged detail of the friction drive members.

In the drawings, my improved transmission is shown as applied to an automobile, the numeral 10 indicating the engine, to which a casing 11 containing the usual fly wheel is secured. The driving shaft 12 of the engine has secured thereto, a bevel gear 13, which meshes with a bevel gear 14, secured to a vertical shaft 15. A transmission gear casing 16 is suitably secured to the fly wheel casing and a bracket 17 secured to said transmission casing is provided with bearings 18, in which the vertical shaft 15 is rotatably mounted. The upper end of shaft 15 has secured thereto a friction disc 19, with the upper face of which a friction wheel 20 engages. The friction wheel 20 is slidably mounted upon a squared countershaft 21, the extremities of which are turned down and are rotatably mounted in the bearings 22, 23, formed in the gear casing 16. The friction wheel 20 is provided with the hubs 24, the outer peripheries of which are turned to engage rotatably within the bearings 25, formed in the yoke arms 26, projecting downwardly from a slide block 27. The slide block 27 is slidably mounted upon a round shaft 28, which in turn is slidably mounted in the bearings 29, 30 provided in the gear casing 16. Shaft 28 is located preferably above and in alignment with the counter shaft 21, and is provided with a turned down or grooved portion 31, with which is adapted to engage a locking block 32, slidably mounted within the guideways 33, cut in the slide block 27. A pin 34, which passes through the locking block 32, preferably midway between the sides thereof, has one arm of a bell crank 35, pivotally anchored thereto. The bell crank 35 is pivotally supported, as at 36, by the slide block 27, and its other arm is pivotally connected, by the pin and slot connection 37, with an operating lever 38. The operating lever 38 passes through a slot 39 in the toe board 40 of the automobile and extends to a point conveniently accessible to the operator, or may be connected to any system of levers leading to such a point.

A spring 41, mounted between the upper face of the locking block 32, and the under face of the top of the guide way 33, normally urges the locking block downwardly to engage within the groove 31, and a collar or flange 42, is provided on the shaft 28 to engage with the bearing 30 and limit the movement of said shaft towards the left. (Fig. 1.)

A driven shaft 45 which leads to the usual differential drive provided in the rear axle of the automobile has secured thereto, a clutch collar 46, the teeth 47 of which are V shaped for a purpose which will hereinafter appear. The clutch collar 46 is slidably but non-rotatably mounted upon the driven shaft by any suitable means, such as the key 48 secured within the collar and slidable within the key way 48$^a$, and said collar is normally urged by a strong spring 49 to hold the teeth 47 thereof in engagement with the coöperating teeth 50, provided on the face of a hub 51, formed on a large spur gear 52. The gear 52 meshes with and is adapted to be driven by a spur pinion 53 secured to the rounded end 54 of the squared shaft 21. The spring 49 has one end thereof bearing against the clutch collar 46, while its other end presses against a collar 55, adjustably fixed, as by a set screw 56, to the driven shaft. A lever 57 pivotally mounted to a fixed support, such as 58, has its lower end pivotally secured to a sleeve 59, mounted in a suitable groove of the clutch collar 46, while its upper end is provided with the yoke arms pivotally connected with the flattened end 61 of the shaft 28 to move said shaft in accordance with the movement of said clutch collar.

A direct positive driving clutch consists of the clutch teeth 62, formed in the hub of the bevel gear 13, and the teeth 63 cut in the face of a clutch collar 64. The clutch collar 64 is slidably, but non-rotatably mounted, as by the key 65, upon the driven shaft 45, and the teeth 63 thereof are normally held out of engagement with the teeth 62 by a spring 66 acting upon a pivoted lever 67, the lower end of which is engaged with a sleeve 68, mounted in a suitable groove in the clutch collar 64. The upper end of the lever 67 terminates in the yoke arms 69 which straddle the shaft 21, to lie within the path of movement of the sliding block 27, said block being provided with the projecting lugs 70 to contact with said yoke arms when the sliding block approaches the outer limit of its travel with respect to the disc 19.

The central portion of the disc 19 is cut away as indicated at 71 in Fig. 3 of the drawing and the outer edge thereof is rounded off as indicated at 72, so that the contacting pressure between the disc and wheel 20 will be released when the wheel is moved over these depressed or lower portions of the disc.

The gears 13 and 14, as shown, are in the ratio of 10 to 1, while the ratio of the disc 19 to the wheel 20, at the outermost circumferential region of full contact of said wheel with the disc 19, is 1 to 1. A gear reduction of 10 to 1 is therefore provided for between the shafts 12 and 21, and the gear reduction between the shafts 21 and 45 provided by the gears 52 and 53 is also in the ratio 1 to 10, so that when the friction wheel 20 is being driven at a maximum speed, the shafts 12 and 45 are being driven at the same speeds. It is to be understood, however, that the gear ratios shown are merely illustrative and that in practice the ratios employed may be much greater than shown in the drawings. The underlying principle of my invention is to decrease greatly the torque at any intermediate point between a driving and driven shaft by a large increase of speed produced by any suitable gear train, which thereby enables not only a very much lighter and more delicate clutching mechanism to be employed at such intermediate point, but also by employing a friction drive at such a point where the torque is greatly reduced, a more efficient drive is secured than if the friction drive were interposed directly between the driving and driven shafts.

The operation of the device is as follows:—Before the automobile engine is started, the friction wheel 20 is brought to neutral position immediately over and in alignment with the cut out portion 71, in which position it is out of driving contact with the disc 19. The engine is then started and the shaft 12 thereof, rotates the disc 19 by means of the gears 13 and 14. The lever 38 is now actuated to move the friction wheel 20 to the left, and as said wheel moves from its position over the cut out portion 71 into contact with the driving face of the disc 19, shaft 21 will be rotated. The rotation of shaft 21 will be communicated by the gears 53, 52 to the driven shaft 45, and the speed of rotation of shafts 21 and 45 will be gradually increased as the friction wheel 20 approaches the periphery of disc 19. When the friction wheel has reached its outermost position of full contact, the parts are so proportioned, as heretofore stated, that the driven shaft 45 will be rotated at the same speed as the driving shaft 12. By continuing the movement of the friction wheel towards the left, after it has reached its outermost full contact position, the speed of the driven shaft 45 will be slightly increased over that of the driving shaft. As the movement of the sliding block 27 is continued, the lugs 70 contact with the yoke arms 69, just as the left hand end of the friction wheel 20 passes from the contact face of the disc over the rounded edge portion 72, and during the time the friction wheel in passing out of engagement with the contact face of the disc, the pressure of the lugs 70 of the sliding block 27 will cause the lever 68 to be moved in a clockwise direction to move the teeth 63 of the clutch collar 64 into engagement with the teeth 62, on the gear 13, thus throwing the shafts 12 and 45 into direct positive driving engagement. Due to the slight increase in speed of the gear 52, caused by the increase in speed of the friction wheel 20, as it passes off the disc 19, the clutch teeth 62 and 63 will engage easily. When the locking block 27 is moved by the lever 38 into the region of full speed drive of the wheel 20, the locking block is snapped into the groove 31, by the spring 41. If the resistance to the rotation of the driven shaft 45 is increased, as for example, when the automobile is travelling up hill, the V shape of the clutch teeth 47, 50 will, because of the increased torque, cause the clutch collar 46 to be moved against the pressure of the spring 49, thus causing the lever 57 to be moved in a clockwise direction and push the shaft 28 to the right, and as the sliding block 27 is locked to said shaft 28 by the engagement of the locking block 32 with the groove 31 of said shaft, the block 27 and friction wheel 20 will therefore be moved to the right, thus automatically decreasing the speed of the shaft 45 in accordance with increases in the resistance offered to the rotation of said shaft, the reverse movement of the parts occurring when the resistance decreases. The length of the key way 48ª in the shaft 45 in which the key 48 engages, is so proportioned that complete disengagement of the clutch teeth will be prevented by the engagement of the key with the end of the keyway.

During the movement of the locking block towards the right, the lugs 70 will be moved out of contact with the yoke arms 69, thus permitting the lever 67 to be moved by the action of the spring 66 to disengage the clutch teeth 62, 63.

If it is desired to decrease the speed of the shaft 45, by manipulation of the lever 38, the lever is moved in a counter-clockwise direction, thus moving the bell crank 35 in a clockwise direction and raising the locking block 32, against the action of spring 41, out of engagement with the groove 31. The sliding block 27 being released from locking engagement with the shaft 28, its movement towards the right by the lever 38, is permitted, and the disengagement of lugs 70, with the yoke arms 69, permits the lever 67 to be simultaneously actuated by the spring 66 to cause the clutch teeth 62, 63 to be disengaged. As the locking block is moved towards the right, the friction wheel 20 rides easily over the rounded edge 72 of the disc 19. By continuing the movement of the lever 38, the friction wheel 20 may be brought over the cut out central portion 71 to stop the rotation of the friction wheel and if it is desired to drive the automobile in a reverse direction, the friction wheel 20 is moved into contact with the right hand portion of the disc 19.

While I have shown my improved transmission device as applied to an automobile transmission, it will be obvious that the principles of construction herein disclosed are of general application and are not to be considered as limited to automobile transmissions.

Having thus described my invention, what I claim as new and desire to secure by Letters Patent, is:

1. In a transmission device, a driving shaft, a driven shaft and a countershaft, a gear reduction train interposed between said driving shaft and countershaft, to drive said countershaft at a much greater speed than said driving shaft, whereby said countershaft will be subjected to a correspondingly decreased torque, a second gear reduction train between said countershaft and driven shaft equal to said first named gear train, and a variable speed friction gearing to connect the high speed members of said gear trains, said friction gearing being constructed and arranged to cause said high speed members of said gear trains to be driven at substantially equal speeds when said friction gearing is moved to its position of maximum speed transmission, and means actuated by the movement of said friction gearing past its position of maximum speed transmission to connect said driving and driven shafts in direct positive driving engagement.

2. In a transmission device, a driving shaft, a driven shaft, and a countershaft, a gear reduction train interposed between said driving shaft and countershaft to drive said countershaft at a much greater speed and a correspondingly decreased torque relative to said driving shaft, a second gear reduction train between said countershaft and driven shaft equal to said first named gear train, a variable speed friction gearing interposed between the high speed members of said gear trains, said friction gearing being constructed and arranged to cause said gear trains to operate at substantially equal speeds when said friction gearing is moved to its position of maximum speed transmission, a clutch to connect said driving and driven shafts in direct positive driving engagement and means automatically actuated by the movement of said friction gearing past its position of maximum speed transmission to move said clutch to its operative position.

3. In a transmission device, a driving shaft, a driven shaft, and a countershaft, a gear reduction train interposed between said driving shaft and countershaft to drive said countershaft at a much greater speed and a correspondingly decreased torque relative to said driving shaft, a second gear reduction train between said countershaft and driven shaft equal to said first named gear train, a variable speed friction gearing interposed between the high speed members of said gear trains, said friction gearing being constructed and arranged to cause said gear trains to operate at substantially equal speeds when said friction gearing is moved to its position of maximum speed transmission, a clutch to connect said driving and driven shafts in direct positive driving engagement, means to hold said clutch normally in inoperative position and means automatically actuated by the movement of said friction gearing past its position of maximum speed transmission to move said clutch to its operative position.

4. In a transmission device, a driving shaft, a driven shaft, and a countershaft, a gear reduction train interposed between said driving shaft and countershaft to drive said countershaft at a much greater speed and a correspondingly decreased torque relative to said driving shaft, a second gear reduction train between said countershaft and driven shaft equal to said first named gear train, a variable speed friction gearing interposed between the high speed members of said gear trains, manually operable means to actuate said friction gearing to vary the speed thereof and means operated by an increase in the resistance offered to the rotation of said driven shaft to actuate said friction gearing and decrease the speed ratio thereof in accordance with the increased resistance.

5. In a transmisison device, a driving shaft, a driven shaft, and a countershaft, a gear reduction train interposed between said driving shaft and countershaft to drive said countershaft at a much greater speed and a correspondingly decreased torque relative to said driving shaft, a second gear reduction train between said countershaft and driven shaft equal to said first named gear train, a variable speed friction gearing interposed between the high speed members of said gear trains, manually operable means to actuate said friction gearing to vary the speed thereof, means operated by an increase in the resistance offered to the rotation of said driven shaft to actuate said friction gearing and decrease the speed ratio thereof in accordance with the increased resistance, and means capable of automatically connecting the last named means with said manually operable means when said last named means is operated by said increased resistance.

6. In a transmission device, a driving shaft, a driven shaft, and a countershaft, a gear reduction train interposed between said driving shaft and countershaft to drive said countershaft at a much greater speed and a correspondingly decreased torque relative to said driving shaft, a second gear reduction train between said countershaft and driven shaft equal to said first named gear train, a variable speed friction gearing interposed between the high speed members of said gear trains, manually operable means to actuate said friction gearing to vary the speed thereof and means operated by an increase in the resistance offered to the rotation of said driven shaft to actuate said friction gearing and decrease the speed ratio thereof in accordance with the increased resistance, and means capable of automatically connecting the last named means with said manually operable means when said last named means is operated by said increased resistance, and said automatic connecting means being constructed and arranged to be rendered inoperative when said manually operable means is actuated to decrease the speed of said friction gearing.

7. In a transmission device, a driving shaft, a driven shaft, and a countershaft, a gear reduction train between said driving shaft and countershaft to drive said countershaft at a greatly increased speed and a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, and a shaft parallel with said countershaft, upon which said block is slidably mounted.

8. In a transmission device, a driving shaft, a driven shaft, and a countershaft, a gear reduction train between said driving shaft and countershaft to drive said countershaft at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, and a shaft parallel with said countershaft, upon which said block is slidably mounted, and manually operable means to slide said block and friction wheel relatively to said friction disc.

9. In a transmission device, a driving shaft, a driven shaft, and a countershaft, a gear reduction train between said driving shaft and countershaft to drive said countershaft at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc and means to move said friction wheel across the face of said friction disc comprising a sliding block in which said friction wheel is rotatably mounted, a shaft parallel with said countershaft, upon which said block is slidably mounted, and a locking block movably mounted upon said sliding block the last named shaft being provided with means adapted to be engaged by said locking block.

10. In a transmission device, a driving shaft, a driven shaft, a countershaft, a gear reduction train between said driving shaft and countershaft, to drive said countershaft at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, a slidable shaft parallel with said countershaft and locking means to automatically lock together said sliding block and slidable shaft.

11. In a transmission device, a driving shaft, a driven shaft and a countershaft, a gear reduction train between said driving shaft and countershaft, to drive said countershaft at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, a sliding shaft parallel with said countershaft, locking means to automatically lock together said sliding block and slidable shaft, manually operable means to actuate said sliding block, and means operated by said manually operable means to disconnect said locking means when said manually operable means is actuated to decrease the speed of said friction wheel.

12. In a transmission device, a driving shaft, a driven shaft and a countershaft, a gear reduction train between said driving shaft and countershaft to drive said countershaft, at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, a slidable shaft parallel with said countershaft, locking means to automatically lock together said sliding block and slidable shaft, and means to actuate automatically said slidable shaft to move said shaft and sliding block and decrease the speed of said friction wheel when the torque upon said driven shaft increases beyond a predetermined amount.

13. In a transmission device, a driving shaft, a driven shaft, and a countershaft, a gear reduction train between said driving shaft and countershaft, to drive said countershaft at a greatly increased speed and at a correspondingly decreased torque relative to said driving shaft, a second gear reduction train between said driven shaft and countershaft equal to said first named gear train, a variable speed friction gearing between the high speed members of said gear trains, said friction gearing comprising a friction disc, a friction wheel movable across the face of said friction disc, means to move said friction wheel across the face of said friction disc comprising a sliding block in which said friction wheel is rotatably mounted, a clutch to connect said driving and driven shafts in direct positive driving relationship and means connected with said clutch extending into the path of movement of said sliding block to cause said clutch to be actuated automatically by the movement of said sliding block to vary the speed of said friction wheel.

In testimony whereof I have affixed my signature.

FREDERIC C. CHADBORN. [L. S.]